(12) United States Patent
Watanabe et al.

(10) Patent No.: US 8,993,024 B2
(45) Date of Patent: *Mar. 31, 2015

(54) FOOD OR DRINK AND METHOD OF PRODUCTION THEREOF

(75) Inventors: Tokutomi Watanabe, Kawasaki (JP); Shun Kamogawa, Kawasaki (JP); Koichiro Hidaka, Osaka (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 1442 days.

This patent is subject to a terminal disclaimer.

(21) Appl. No.: 12/161,757

(22) PCT Filed: Jan. 23, 2007

(86) PCT No.: PCT/JP2007/050995
§ 371 (c)(1),
(2), (4) Date: Jul. 22, 2008

(87) PCT Pub. No.: WO2007/083812
PCT Pub. Date: Jul. 26, 2007

(65) Prior Publication Data
US 2010/0233348 A1    Sep. 16, 2010

(30) Foreign Application Priority Data

Jan. 23, 2006   (JP) .................................. 2006-014404

(51) Int. Cl.
*A23L 1/28* (2006.01)
*A23F 3/06* (2006.01)
(Continued)

(52) U.S. Cl.
CPC ... *A23F 3/06* (2013.01); *A23F 3/12* (2013.01); *A23F 3/18* (2013.01); *A23L 1/2005* (2013.01);
(Continued)

(58) Field of Classification Search
CPC ....... A23L 1/366; A23L 1/337; A23L 1/3002; A23L 1/28; A23L 1/2128; A23L 1/2005; A23L 2/39; A23L 2/02; A23F 3/06; A23F 3/12; A23F 3/18; C11B 9/02; C12G 3/06

USPC .................. 426/417, 651, 429, 592
See application file for complete search history.

(56) References Cited

U.S. PATENT DOCUMENTS 1,840,798 A * 1/1932 Tressler ........................ 426/429
1,979,124 A   10/1934 Tival et al.
(Continued)

FOREIGN PATENT DOCUMENTS

DE    201 21 482 U1   1/2003
FR    2608923 A1      7/1988
(Continued)

OTHER PUBLICATIONS

Derwent Abstract for JP2002-306111.*
(Continued)

*Primary Examiner* — Patricia George
(74) *Attorney, Agent, or Firm* — Drinker Biddle & Reath LLP

(57) ABSTRACT

The present invention provides a method of producing a food or drink containing one or more components extracted from a raw material by using fruit(s), vegetable(s), bean(s), nut(s), mushroom(s), alga(e) or tea(s) as the raw material, which comprises the following steps: freezing the raw material; grinding the frozen matter at a controlled temperature; and dipping the ground matter in a solvent and thus extracting one or more components of the raw material. It is preferable that the temperature in the grinding step is controlled to a level not higher than the brittle temperature of an aroma component, a colorant or an essential oil which can be extracted from the raw material. According to the production method of the present invention, the obtained food or drink can sufficiently contain a desired component contained in fruit(s) or vegetable(s).

9 Claims, 11 Drawing Sheets

(51) Int. Cl.
*A23F 3/12* (2006.01)
*A23F 3/18* (2006.01)
*A23L 1/20* (2006.01)
*A23L 1/212* (2006.01)
*A23L 1/30* (2006.01)
*A23L 1/337* (2006.01)
*A23L 1/36* (2006.01)
*A23L 2/02* (2006.01)
*A23L 2/39* (2006.01)
*C11B 9/02* (2006.01)
*C12G 3/06* (2006.01)

(52) U.S. Cl.
CPC ............ *A23L 1/2128* (2013.01); *A23L 1/28* (2013.01); *A23L 1/3002* (2013.01); *A23L 1/337* (2013.01); *A23L 1/366* (2013.01); *A23L 2/02* (2013.01); *A23L 2/39* (2013.01); *C11B 9/02* (2013.01); *C12G 3/06* (2013.01)
USPC ............ 426/429; 426/311; 426/592; 426/546

(56) References Cited

U.S. PATENT DOCUMENTS

| | | | | |
|---|---|---|---|---|
| 3,395,022 | A | * | 7/1968 | Vollink et al. ............... 426/620 |
| 3,567,469 | A | * | 3/1971 | Calderon-Pedroza ........ 426/615 |
| 3,824,323 | A | * | 7/1974 | Harvey .......................... 426/429 |
| 3,911,145 | A | * | 10/1975 | Marion .......................... 426/597 |
| 5,230,889 | A | | 7/1993 | Inoue |
| 6,124,525 | A | | 9/2000 | Botella |
| 6,350,477 | B1 | | 2/2002 | Yamamoto et al. |
| 6,465,019 | B1 | | 10/2002 | Bok et al. |
| 2009/0087526 | A1 | | 4/2009 | Taniguchi et al. |

FOREIGN PATENT DOCUMENTS

| | | |
|---|---|---|
| JP | 55-061778 | 5/1980 |
| JP | 58-134942 | 8/1983 |
| JP | 60237958 A | 11/1984 |
| JP | 61-166353 | 7/1986 |
| JP | 4-316448 | 11/1992 |
| JP | 10-262641 | 10/1998 |
| JP | 2000-312579 | 11/2000 |
| JP | 2000-350571 | 12/2000 |
| JP | 2001-299323 | 10/2001 |
| JP | 2002-511237 | 4/2002 |
| JP | 2002-125653 | 5/2002 |
| JP | 2002-306111 | * 10/2002 |
| JP | 2002-360241 | 12/2002 |
| JP | 2005-124567 | 5/2005 |
| WO | WO-9921549 A1 | 5/1999 |
| WO | WO-2005002349 A1 | 1/2005 |
| WO | WO-2006009252 A1 | 1/2006 |

OTHER PUBLICATIONS

International Search Report dated Mar. 6, 2007 in PCT/JP2007/050995 filed Jan. 23, 2007.
"[Hyotenka] ga Atsui, Teppan de 'Hiyasu' Ice/Choteion de Kajitsu o Funsai", Sankei Shimbun Tokyo Morning Paper, Jul. 3, 2005, p. 18 (w/ English-language translation).
"[Toketsu Funsai] de Oishiku Suntory, Tei Alcohol Inryo de Shinseiho", Nikkan Kogyo Shimbun, Oct. 6, 2005, p. 17 (w/ English-language translation).
"Suntory Kajitsu o Shunkan Toketsu Chuhai 3 Shu 5 Gatsu Hatsubai", Nikkan Kogyo Shimbun, Mar. 31, 2005, p. 33 (w/ English-language translation).
Supplementary European Search Report mailed Nov. 7, 2011, in EP 07713687.7.
"Citrus fuit oil extn.—by extn. of frozen, crushed citrus fruit rind with organic solvent and distilling," vol. 1983, No. 19, Mar. 30, 1983, XP002525625, Abstract.
English Translation of Appln. No. FR2608923A1.
European Search Report issued May 16, 2011 in Appln. No. 05761791.2.
Database WPI Week 200271 Thomson Scientific, London, GB; AN 2002-658679 XP002525622 & CN 1 351 985 A (Pan J) Jun. 5, 2002.
Database WPI Week 200230 Thomson Scientific, London, GB; AN 2002-248238 XP002525623 & JP 2002 029975 A (Pokka Corp KK) Jan. 29, 2002.
Database WPI Week 200331 Thomson Scientific, London, GB; AN 2003-316769 XP002525624 & JP 2001 204425 A (Pokka Corp KK) Jul. 31, 2001.
Database WPI Week 198319 Thomson Scientific, London, GB; AN 1983-44993K XP002525625 & JP 58 053995 A (Hasegawa Co Ltd) Mar. 30, 1983.
Edited by Shufunotomo Co., Ltd., Tsukemono to Kajitsushu, Shufunotomo Co., Ltd., 1997, pp. 105-127 (in Japanese).
International Search Report dated Nov. 8, 2005 in PCT/JP2005/013489 filed Jul. 22, 2005.

* cited by examiner

FOOD OR DRINK AND METHOD OF PRODUCTION THEREOF

CROSS REFERENCE TO RELATED APPLICATIONS

This application is the National Stage of International Application No. PCT/JP2007/050995, filed Jan. 23, 2007, and claims benefit of Japanese Application No. 2006-014404, filed Jan. 23, 2006, both of which are herein incorporated by reference in their entirety.

TECHNICAL FIELD

The present invention relates to a method of producing a food or drink by using as a raw material one or more members selected from the group consisting of fruits, vegetables, beans, nuts, mushrooms, algae and teas. In particular, it relates to a method of producing a food or drink which comprises the step of grinding the raw material in a frozen state.

BACKGROUND ART

In preparing and handling fruits and the like used as raw materials for producing foods or drinks, various devices have been made to utilize the characteristics of the raw materials in the final products. To produce a distilled liquor or an alcohol drink containing a fruit dipped in alcohol which keeps the fresh aroma of the raw fruit, is free from the generation of a secondary smell by heating, and thus has a natural flavor, for example, studies have been made on a method comprising dipping a fresh fruit in an aqueous alcohol solution having an appropriate concentration, vacuum-distilling the alcohol extract thus obtained under appropriately reduced pressure and collecting the distillate (Patent document 1). Also, there has been proposed a product which is prepared by freezing a fruit juice as such without vacuum-concentration (heating) to thereby avoid damage to the freshness of the raw fruit.

To stably supply a material keeping the flavor and color of Japanese persimmon at all times of the year, on the other hand, studies have also been made on a technique whereby Japanese persimmons are frozen by using liquid nitrogen, ground with a low-temperature grinder and then freeze-dried in vacuo to give a powder, though it is not intended to use Japanese persimmon as a raw material in producing low alcohol drinks in this case (Patent document 2).

Patent document 1: Japanese Patent Laid-Open No. 2002-125653
Patent document 2: Japanese Patent Laid-Open SHO-61-166353

DISCLOSURE OF THE INVENTION

Problems to be Solved by the Invention

According to the present inventors' studies, however, it has been clarified that these techniques can hardly create desirable flavors in target foods or drinks. Thus, the present invention aims at providing a food or drink having a desirable flavor. As the results of intensive studies, the present inventors have found that, in the case of powdering fruits, etc. by freeze-drying and extracting a required component, it is important to control the temperature at grinding as well as appropriately selecting other factors such as the part of the fruits, etc. (e.g., using the whole fruit or not), pretreatment, freezing temperature, grain size of the ground matter and extraction conditions. That is, the present inventors have found that components extracted from the ground matter can be adjusted by controlling the temperature at grinding since the force required in grinding frozen fruits, etc. varies depending on the grinding temperature and, furthermore, each of the fruits, etc. per se and components, essential oil, etc. originating the fruits, etc. has its inherent brittle temperature. The present invention has been thus completed.

Means for Solving the Problems

Accordingly, the present invention provides:

(1) a method of producing a food or drink containing one or more components extracted from a raw material by using fruit(s), vegetable(s), bean(s), nut(s), mushroom(s), alga(e) or tea(s) as the raw material which comprises the following steps:
  freezing the raw material;
  grinding the frozen matter at a controlled temperature; and
  dipping the ground matter in a solvent and thus extracting one or more components of the raw material;

(2) a method of producing a ground matter of a raw material by using fruit(s), vegetable(s), bean(s), nut(s), mushroom(s), alga(e) or tea(s) as the raw material which comprises the following steps:
  freezing the raw material; and
  grinding the frozen matter at a controlled temperature:

(3) a method of extracting a component of a raw material by using fruit(s), vegetable(s), bean(s), nut(s), mushroom(s), alga(e) or tea(s) as the raw material which comprises the following steps:
  freezing the raw material;
  grinding the frozen matter at a controlled temperature; and
  dipping the ground matter in a solvent and thus extracting one or more components of the raw material; and (4) a food or drink containing a 5% to 100% alcohol extract of a citrus fruit having been ground at −196 to −135° C.

Advantage of the Invention

By controlling the grinding temperature of a raw material and thus conducting the extraction while selecting the properties of the ground matter according to the present invention, the flavor component and composition can be controlled and thus foods or drinks having various flavors can be provided.

BEST MODE FOR CARRYING OUT THE INVENTION

Figure 1A:
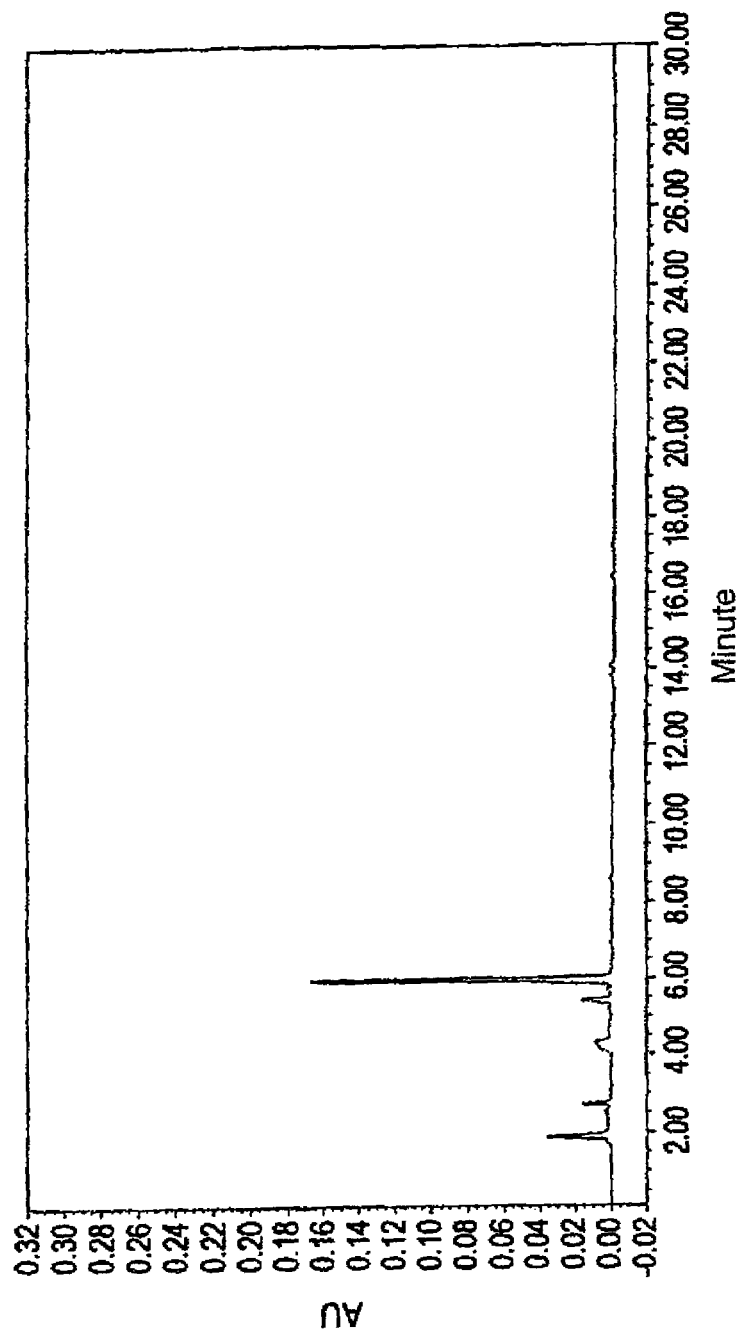
FIG. 1A shows the HPLC chart of a marketed chuhai A.

Except in special cases, the term "fruit" as used herein includes pomaceous fruits, quasipomaceous fruits (citrus fruits, etc.), stony fruits, berry fruits, nutty fruits and fruit vegetables handled as fruits on the market (for example, strawberry, watermelon and melon). Any one of these fruits or a combination of two or more thereof may be used.

In the present invention, use can be preferably made of citrus fruits such as lemon, grapefruit (white and ruby red varieties), lime, oranges (navel orange, Valencia orange), Satsuma orange (*Citrus unshiu*), tangor, Chinese citron (*Citrus natsudaidai* Hayata), *Citrus hassaku, Citrus tamurana* hort. ex *T. Tanaka, Citrus depressa, Citrus sudachi, Citrus junos, Citrus sphaerocarpa, Citrus aurantium, Citrus iyo, Citrus reticulata*, Marumi Kumquat (*Fortunella japonica*), *Citrus sulcata*, Oroblanco and *Citrus grandis*. Also, use can be preferably made of stony fruits such as apricot, cherry, ume (*Prunus mume*), plums (Japanese plum, prune), peaches (peach, nectarine and yellow peach), berry fruits such as grapes (Muscat grape, Riesling grape, Delaware grape and Kyoho grape) and strawberry. Moreover, banana can be preferably used. Furthermore, use can be preferably made of blackberry, blueberry, raspberry, gooseberry (*Ribes grossularia* L.), pomegranate, apple, pears (Japanese pear, Chinese pear and European pear), *Chaenomeles sinensis*, kiwi fruit, pineapple, passion fruit, acerola, lychee, melon and watermelon. Other examples include *Akebia quinata*, atemoya (*Annona atemoya*), avocado, fig, olive, Japanese persimmon, *Cucumis metuliferus* Naudin, guava, *Elaeagnus* fruit, coconut, carambola (also called "star fruit"), tangero, *Annona sherimola*, durian, jujube, date palm, hascap (*Lonicera caerulea* L. var. *emphyllocalyx* Nakai), papaya, pitaya, Japanese loquat, Tongan, *Casimiroa edulis*, oriental melon, *Chaenomeles sinensis*, mango, mangostin and bayberry (*Myrica rubra*).

Except in special cases, the term "vegetable" as used herein includes leaf and stem vegetables, fruit vegetables (excluding those handled as fruits on the market), flower vegetables and root vegetables. Moreover, shiso (*Perilla frutescens*), ginger, chili pepper, herbs (plants having drug effect, for example, mint, lemongrass, coriander, Italian parsley, rosemary, basil, chamomile, hibiscus, rosehip, silvervine, and *Chaenomeles speciosa*), wasabi (*Eutrema japonicum*), *Zanthoxylum piperitum*, tree barks (barks of pine, oak, bayberry, etc.) and aloe are also included therein. Either one of these vegetables or a combination of two or more thereof may be used. In the present invention, use can be preferably made of tomato, celery, carrot, parsley, spinach, watercress, sweet pepper, lettuce, cabbage, beet, ginger (root ginger and leaf ginger), shiso (green shiso and purple shiso), corn and kale.

The term "bean" as used herein include coffee bean, cacao bean, soybeans (yellow soybean, green soybean and black soybean), adzuki beans (dainagon, chunagon, shonagon and white adzuki bean), kidney beans (toramame, tebo, kintokimame and uzuramame), broad bean, black-eye bean, peas (shelled pea and podded pea), *Vigna angularis* var. *nipponensis*, chick pea and *Phaseolus coccineus*. In the present invention, use can be made of any of whole grains, shelled beans, fresh beans, dried beans, heated (for example, boiled) beans and fermented beans.

Except in special cases, the term "nut" as used herein includes edible plant seeds and nutty fruits. Examples thereof include sesame, poppy seed, chestnut, walnut, peanut, almond, cashew nut, hazelnut, macadamia nut, pecan nut, coconut, Brazil nut, pistachio, gingko nut, pine seed, sweet acorn, horse chestnut (*Aesculus turbinata* seed), lotus seed, water chestnut (Traps japonica root), pumpkin seed, watermelon seed, sunflower seed, Chinese wolfberry seed, burseraceous kernel and *Ficus awkeotsang* Makino.

Except in special cases, the term "mushroom" as used herein include a fungus forming a large-size fruit body. Among such mushrooms, the present invention is applicable to edible ones including shiitake mushroom, *Tricholoma matsutake* (S. Ito et Imai), *Agrocybe cylindracea* (DC.:Fr.) Maire, shimeji mushrooms (*Lyophyllum shimeji, Hypsizigus marmoreus* (Peck.) Bigelow and *Lyophyllum decastes*), *Flammulina velutipes, Pleurotus ostreatus* (Jacq.:Fr.) Kummer, *Pleurotus eryngii, Grifola frondosa, Pleurotus cornucopiae* (Paulet) Rolland var. *citrinopileatus, Pleurotus abalonus, Pholiota nameko*, white mushroom (*Agaricus bisporus*), *Auricularia auricula* (Hook.) and *Ganoderma lucidum*.

Except in special cases, the term "alga" as used herein include a plant growing in freshwater or seawater. Among such algae, the present invention is applicable to edible ones including mozuku (*Cladosiphon okamuranus*, etc.), tengusa (*Gelidiaceae*), *Sargassum fusiforme, Undaria pinnatifida* (kukiwakame, mekabu), kombus (*Laminaria japonica, Laminaria ochotensis*, rausu kombu, mitsuishi kombu), sea lettuce, green layer, amanori (*Porphyra* sp.), *Eisenia bicyclis, Collema, Campylaephora hypnaeoides, Gracilaria vermiculophylla, Prsiola japonica, Aphanothece sacrum, Meristotheca papulosa, Glopopeltis, Caulerpa lentillifera* and *Ceratophyllum demersum* var. *demersum*.

Except in special cases, the term "tea" as used herein include tea leaf, tea stem, seed and so on usable as teas. Examples thereof include leaves of fermented teas (oolong tea and black tea), leaves of green teas (gyokuro (high-grade tea), sencha (moderate-grade tea), bancha (coarse tea) and hojicha (roasted tea)), mulberry leaf, Japanese persimmon leaf, *Senna obtusifolia* seed (raw material of habucha), bamboo leaf, guava leaf, barley, Job's tears, brown rice and *Gynostemma pentaphyllum*. These materials may be dried or roasted matters.

Although the present invention will be sometimes illustrated herein by referring to fruits by way of example, such illustration also applies to vegetables, beans, nuts, mushrooms, algae and teas except in special cases.

According to the production method of the invention, the natural flavor of the raw materials can be fully utilized in the obtained food or drink. In the present invention, therefore, use can be particularly preferably made of a fruit having a favorable aroma and well balanced taste (sweetness, sourness, bitterness and so on). From this point of view, it is preferable in the invention to use aromatic citrus fruits (in particular, lemon, grapefruit (white and ruby red varieties), lime, oranges (navel orange, Valencia orange), tangor, Chinese citron (*Citrus natsudaidai* Hayata), *Citrus hassaku, Citrus tamurana* hort. ex *T. Tanaka, Citrus depressa, Citrus sudachi, Citrus junos, Citrus sphaerocarpa* and Oroblanco).

According to the production method of the invention, the obtained alcohol drink can contain an efficacious component such as vitamin P contained in the fruit(s) and/or vegetable(s). From this point of view, it is preferable in the invention to use one or more vitamin P-rich fruits selected from among citrus fruits (in particular, lemon, grapefruit, Satsuma orange and orange), apricot, cherry, blackberry, pineapple and papaya. Vitamin P is a generic name that includes flavonoid compounds, for example, colorants (flavones) contained in citrus fruits, rutins contained in buckwheat and so on. Eriocitrin having the following structure:

[Chemical formula 1]

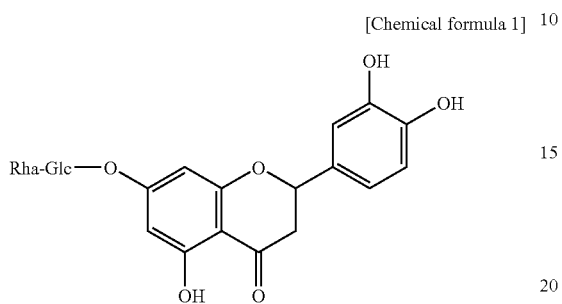

and hesperidin having the following structure:

[Chemical formula 2]

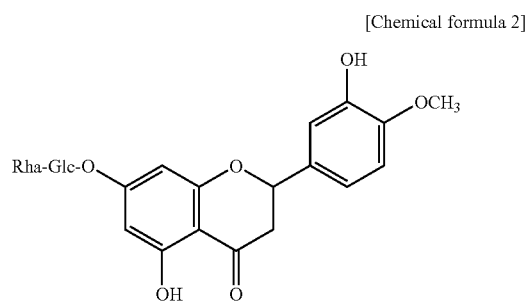

fall within the scope of vitamin P. Vitamin P is also called "flavonoid" or "lemon polyphenol" in some cases.

Except in special cases, the term "fruit", "vegetable", "bean", "nut", "mushroom", "alga" and "tea" as used herein with respect to a raw material means a whole material involving juice and solid matters. Except in special cases, moreover, the term "fruit juice" or "vegetable juice" as used herein with respect to a raw material means a liquid having been preliminarily prepared by, for example, pressing. Namely, a fruit- or vegetable-origin liquid that is contained in the final product or the like as the result of using a whole fruit and/or vegetable as a raw material is excluded from the scope thereof.

The term "food" as used herein includes processed foods, while the term "drink" as used herein includes alcohol drinks, refreshing drinks, fruit juices and nutrition-supplement drinks.

Except in special cases, the term "alcohol drinks" as used herein means drinks containing alcohol or liquids containing alcohol which is used as a material for producing a drink (also called "starting alcohol" in some cases).

Except in special cases, the term "alcohol" as used herein means a drinkable alcohol (ethanol, ethyl alcohol). It involves not only pure alcohol but also a drinkable liquid containing alcohol and/or a liquid usable in producing an alcohol-containing food. Except in special cases, the unit "%" as used herein with respect to alcohol concentration has the same meaning as degree of alcohol (°) and indicates the amount of pure alcohol contained per 100 mL of solution (volume/volume).

Except in special cases, the term "low alcohol drink" as used herein means an alcoholic drink containing less than 9% alcohol.

The raw material to be used in the present invention may be pretreated before the freezing and/or grinding. The pretreatment includes division, selection or removal of part(s), pre-freezing and a combination thereof. The raw material is not restricted in size so long as it can be supplied into a freezer and a grinder. To minimize the freezing time, it is possible in some cases to cut it into small pieces. To minimize damage and conduct freezing while preventing contact with air, on the other hand, it is preferable in some cases to avoid cutting the raw material Into too small pieces. Before dividing, it may be pre-frozen to thereby prevent leakage of the juice or component(s). As the raw material, it is possible to use a whole fruit or vegetable including pericarp and seeds. Alternatively, it is possible to remove a nonedible part, a part containing no effective component and/or a part containing an undesirable component before using. These parts may be removed either before freezing or after freezing and before grinding. In the case of using a citrus fruit, for example, it is possible to pre-freeze the whole fruit having the pericarp at −4° C. to −80° C. and then divide into 2 to 16 portions or to cut it into pieces (about 1 cm×about 1 cm) before grinding. In the case of using a stony fruit, it is possible to freeze the whole fruit having the pericarp and the seed and then grind it as such.

The freezing treatment in the present invention is carried out to solidify the raw material by freezing to thereby prevent the components thereof from denaturation and make it possible to sufficiently and easily conduct the grinding at a low temperature. So long as these objects can be achieved, this step is restricted neither in freezing machine nor in freezing method. That is, use may be made of any method selected from among, for example, the air freezing method, the air blast freezing method, the contact freezing method, the brine freezing method and the liquid nitrogen freezing method. From the viewpoint of achieving rapid freezing, a freezing method using liquid nitrogen is favorable.

In the method according to the present invention, the frozen material is ground at a controlled temperature. It is preferable that this temperature is at such a level as allowing effective grinding to thereby obtain a component or component composition participating in, for example, a desired taste from the raw material, i.e., a temperature being effective in the grinding. The effective grinding temperature can be determined depending on the brittle temperature of the component or composition originating in the raw material. The temperature may be controlled so that it falls within a specific temperature range or does not exceed a definite temperature (for example, not higher than the brittle temperature).

Except in special cases, the term "brittle temperature (also called "brittle point" in some cases)" as used herein means the temperature at which the target object rapidly becomes brittle (fragile and easily breakable) at a low temperature. The brittle temperature can be determined by employing a method commonly carried out in the field of polymers, etc. As will be described in Example 13 hereinafter, for example, the sample center temperature is plotted versus the breaking load and the temperature at which the breaking load shows the most remarkable lowering is referred as to the brittle temperature.

In the present invention, the effective grinding temperature can be determined based on the brittle temperature. The temperature thus determined may be either the brittle temperature, a temperature not higher than the brittle temperature of one component, a temperature not hither than the brittle temperatures of all components or a temperature between the brittle temperature of one component and the brittle temperature of another component.

It is preferable to determine the effective grinding temperature based on the brittle temperature of an aroma component, a colorant or an essential oil which originates from the raw material. Examples of the aroma component include limonene, while examples of the colorant include a chlorophyll, a carotenoid, an anthocyan and a flavonoid.

In the case of using a citrus fruit, it may be determined based on the brittle temperature of limonene and/or the brittle temperature of a citrus fruit essential oil (for example, lemon essential oil, lime essential oil or grapefruit essential oil). For example, the brittle temperatures of limonene, lemon essential oil, lime essential oil and grapefruit essential oil are respectively −156° C., −148° C., −136° C. and −143° C.

The grinding treatment is restricted neither in grinding machine nor in grinding method. Since the grinding is frequently accompanied by heat generation, however, it is preferable to employ one provided with a temperature controlling unit so that the grinding can be surely carried out at the desired temperature (for example, a temperature not higher than the brittle temperature of a target component or the like). When it is intended to conduct the grinding at a temperature not higher than the brittle temperature of one component, an appropriate temperature controlling unit may be selected so long as the frozen matter can be maintained at the temperature or below. For example, use may be made of a cooling medium such as liquid nitrogen. In the case of using liquid nitrogen in the grinding treatment, the liquid nitrogen may be usually used merely in a small amount compared with the case where the raw material is to be frozen at −196° C. and then ground.

The extent of the grinding is not particularly restricted, so long as the extraction can be sufficiently and easily conducted thereafter. The grinding is conducted until an average grain size of the frozen matter is attained of about 1 μm to about 1000 μm, preferably about 1 μm to about 400 μm, more preferably about 1 μm to about 200 μm, and more preferably about 1 μm to about 100 μm, when measured by a method commonly employed in the art. Considering the fact that the cell size of citrus fruits such as lemon ranges from 10 to 50 μm and the oil sac size in the epicarp (flavedo) thereof is about 250 μm (Osamu Ichikawa, *Shokuhin Soshikigaku*, Tokyo Koseikan, p. 239), it is preferable to grind the fruit until an average grain size is reduced to less than about 50 μm, for example about 40 μm or about 30 μm to thereby sufficiently utilize the intracellular components of an essential oil, etc. The ground matter may be a micro ground matter. Except in special cases, the average grain size of the ground matter obtained by the grinding treatment as described herein means the median size (the grain size corresponding to 50% on a sieve analysis distribution curve, also called "medium size" or "50% grain size").

The frozen and ground matter thus obtained may be subjected to an extraction step. The frozen and ground matter thus obtained may be subjected to an extraction step as it is. Alternatively, it may be thawed to give a paste which is then extracted.

In the case of extracting the frozen and ground matter, an appropriate solvent (for example, an alcohol) is used. As the alcohol to be used, an alcohol having an alcohol concentration of from about 15% to about 100% (preferably from about 25% to about 60%) is employed so that the target water-soluble component and/or a fat-soluble component can be sufficiently and/or balancedly extracted while taking the flavor, stability, microbial management and so on into consideration. By altering the alcohol concentration, the type or content of a flavor or efficacious component can be varied. More specifically, in the case of using a fruit (in particular, a citrus fruit typified by lemon), the alcohol concentration can be controlled to about 20% or more, preferably about 30% or more and still preferably about 40% or more from the viewpoint of creating sufficient flavor. From the viewpoint of preventing an undesirable taste (for example, bitterness) and an offensive odor (for example, musty odor), the alcohol content may be regulated to about 60% or less, preferably about 50% or less. Moreover, from the viewpoint of placing emphasis on transparency, it is possible to select such an alcohol concentration as giving a turbidity of about 120 Helm or less. In the case of using a fruit (in particular, a citrus fruit typified by lemon), the alcohol concentration may be controlled to, for example, about 15% to about 50%, preferably about 20% to about 45%. In the case of using a fruit (in particular, a citrus fruit typified by lemon), it is preferable for producing a balanced product to control the alcohol concentration to, for example, about 20% to about 60%, preferably about 30% to about 50% and still preferably about 40%.

The alcohol to be used in the extraction may be either raw alcohol or alcohol drinks. The method of producing the same is not particularly restricted. Namely, use can be made of either a brewed alcohol drink, a distilled alcohol drink or a liqueur. The starting material thereof is not specifically restricted either. As the alcohol to be used in the dipping and the extraction, use may be made of either a single alcohol or a combination of multiple alcohols.

As the alcohol to be used in the extraction, use can be appropriately made of a raw alcohol, a distilled alcohol drink or a liqueur. As the distilled alcohol drink, it is preferable to use shochu, which may be produced from any raw material selected from among rice, sweet potato, barley, corn, buckwheat, brown sugar, molasses, date palm, crudely distilled alcohol and so on, and which may be either korui (multiply-distilled) or otsurui (singly-distilled) shochu, vodka or spirit. In addition, use can be also made of whiskey, brandy, gin, rum, tequila, etc.

The dipping ratio and the extraction time can be appropriately determined depending on the type of the material, the grain size of the ground matter, the type and amount of the target component to be extracted, the desired extraction efficiency and so on. With respect to the dipping ratio, the frozen and ground matter is used generally in an amount of from about 1 g to about 500 g, preferably from about 5 g to about 300 g and still preferably from about 10 g to about 200 g, per 1 L of the alcohol. The extraction time generally ranges from about half a day to several months. In the case of a citrus fruit, the extraction time is preferably from about a day to about 3 days, while a stony fruit such as ume may be extracted over several months.

By adjusting the conditions (for example, extraction time, alcohol degree, amount of the fruit and so on), the flavor and components of the final product can be controlled. Accordingly, it becomes possible to maintain stable qualities of the alcohol-dipped material or a food or drink using the same thus obtained, even though the raw fruit(s) and/or vegetable(s) vary in quality, etc.

After completion of the extraction step, the alcohol-dipped material is obtained either directly from the leachate or after removing solid matters therefrom by filtration. For the filtration, use can be made of a method commonly employed in the art for the same purpose, for example, the method using diatomaceous earth. The alcohol-dipped material thus obtained may be subjected to an additional treatment such as distillation, if needed.

According to the method of the present invention, components originating in the raw material can be prevented from loss, denaturation caused by oxidation and so on. Since the food or drink obtained by the production method according to the invention can sufficiently and/or balancedly contain the desired component, it has a satisfactory flavor without further addition of any perfume, fruit juice, etc. Furthermore, it is surprisingly found that, by grinding the frozen matter at the effective grinding temperature that has been determined based on the brittle temperature, the grinding can be easily conducted and, moreover, the concentration and ratio of the target component can be controlled. The food or drink obtained by the production method according to the present invention suffers from little denaturation in components such as a flavor component and has excellent keeping qualities. Such a food or drink is a novel one that cannot be obtained by the existing techniques. Accordingly, the present invention provides a food or drink obtained by the production method of the invention.

Since the food or drink obtained by the production method according to the invention can sufficiently and/or balancedly contain the desired component, it has a satisfactorily excellent flavor without further addition of any food additives such as a fruit juice, a vegetable juice, a perfume, a souring agent, a colorant etc. or adding only a small amount thereof. Since the food or drink according to the present invention is obtained by freezing and micro grinding the raw material at a temperature determined based on the brittle temperature, it contains a sufficient amount of the desired component while the content of undesired components can be reduced therein.

As a preferable embodiment of the present invention, there is provided a low alcohol drink which is free from perfume. As another preferable embodiment of the invention, there is provided a low alcohol drink which is free from perfume, contains only 5% (volume/volume) or less, preferably 3% or less and still preferably 1.5% or less of a fruit juice and still has a sufficiently good taste. By addition of a perfume, a low alcohol drink having an enriched aroma can be produced.

In addition to liquors, examples of the food or drink according to the present invention include a fruit/vegetable juice, a carbonated drink, a nutrition-supplement drink, a jam, a paste, a jelly, an ice cream, a yogurt, a cake and a salad.

The food and drink of the invention may contain a saccharide and a souring agent. As the saccharide, use can be made of, for example, sucrose, fructose, glucose, high-fructose corn syrup and so on. As the souring agent, use can be made of, for example, citric acid, malic acid, phosphoric acid and so on.

Example 1

Production of Alcohol Drink Having Frozen and Ground Lemon Dipped in Alcohol

Fresh lemon fruits were divided into 4 portions so that they could be supplied into a frozen grinder, as will be described hereinafter, and then frozen by using liquid nitrogen at −196° C. Next, the frozen matter was supplied into a frozen grinder (Linrex Mill; manufactured by HOSOKAWA MICRON CO.) and ground in the frozen state to give a frozen and ground matter in the form of a white and loose powder having a grain size of about 30 μm. The grain size was determined by diluting about 20-fold the frozen and ground matter with water and measuring the grain size distribution with a Laser Diffraction Particle Size Analyzer (SALD-3100; manufactured by SHIMADZU CO.). Next, the frozen and ground matter was dipped in a 40% raw alcohol for 2 days (100 g/L). The obtained dipping solution was filtered through diatomaceous earth to thereby remove solid matters. Thus, an alcohol drink (alcohol content: 40%) having frozen and ground lemon dipped in alcohol was obtained.

Example 2

Production of Alcohol Drink Having Frozen and Ground Grapefruit Dipped in Alcohol Fresh grapefruits were divided into 8 portions so that they could be supplied into a frozen grinder and then frozen by using liquid nitrogen at −196° C. Next, the frozen matter was supplied into a frozen grinder (see Example 1) and ground in the frozen state to give a frozen and ground matter in the form of a white and loose powder having a grain size of about 50 μm. The grain size was determined by the same method as in Example 1. The frozen and ground matter was dipped in a 40% raw alcohol for 2 days (100 g/L). The obtained dipping solution was filtered through diatomaceous earth to thereby remove solid matters. Thus, an alcohol drink (alcohol content: 40%) having frozen and ground grapefruit dipped in alcohol was obtained.

Example 3

Production of Low Alcohol Drink

By using the alcohol drinks having frozen and ground fruits dipped in alcohol obtained in Examples 1 and 2 as a starting material, RTDs of the following compositions were produced.

TABLE 1

| | Composition | | |
| --- | --- | --- | --- |
| | Lemon RTD | Grapefruit RTD | Remarks |
| Starting alcohol drink (Ex. 1) | 25 mL | | alcohol 40% |
| Starting alcohol drink (Ex. 2) | | 25 mL | alcohol 40% |
| Raw alcohol | 8.7 mL | 8.7 mL | alcohol 95% |
| Saccharide | 9.8 g | 9.8 g | |
| Souring agent | 0.8 g | 0.8 g | |
| Carbonic water | ca 210 mL | ca 210 mL | |
| Total | 250 mL | 250 Ml | |

The RTDs respectively using the starting alcohol drinks of Examples 1 and 2 each had a fresh and soft flavor differing from the existing chuhai products using lemon or grapefruit.

Example 4

Comparison in Components with Existing Products

The starting alcohol drink of Example 1, a marketed chuhai A (lemon juice content: 3%, alcohol content: 7%), a marketed chuhai B (lemon juice content: 10%, alcohol content: 7%) and a marketed chuhai C (lemon juice content: 5%, alcohol content: 7%) were analyzed by HPLC.

Pretreatment:

The starting alcohol drink of Example 1 was filtered as such through a 0.45 μm filter and the obtained supernatant was employed. A 10 mL portion of each of the marketed chuhais was sampled, concentrated 10-fold on an evaporator and filtered through a 0.45 μm filter before using.

Figure 1B:
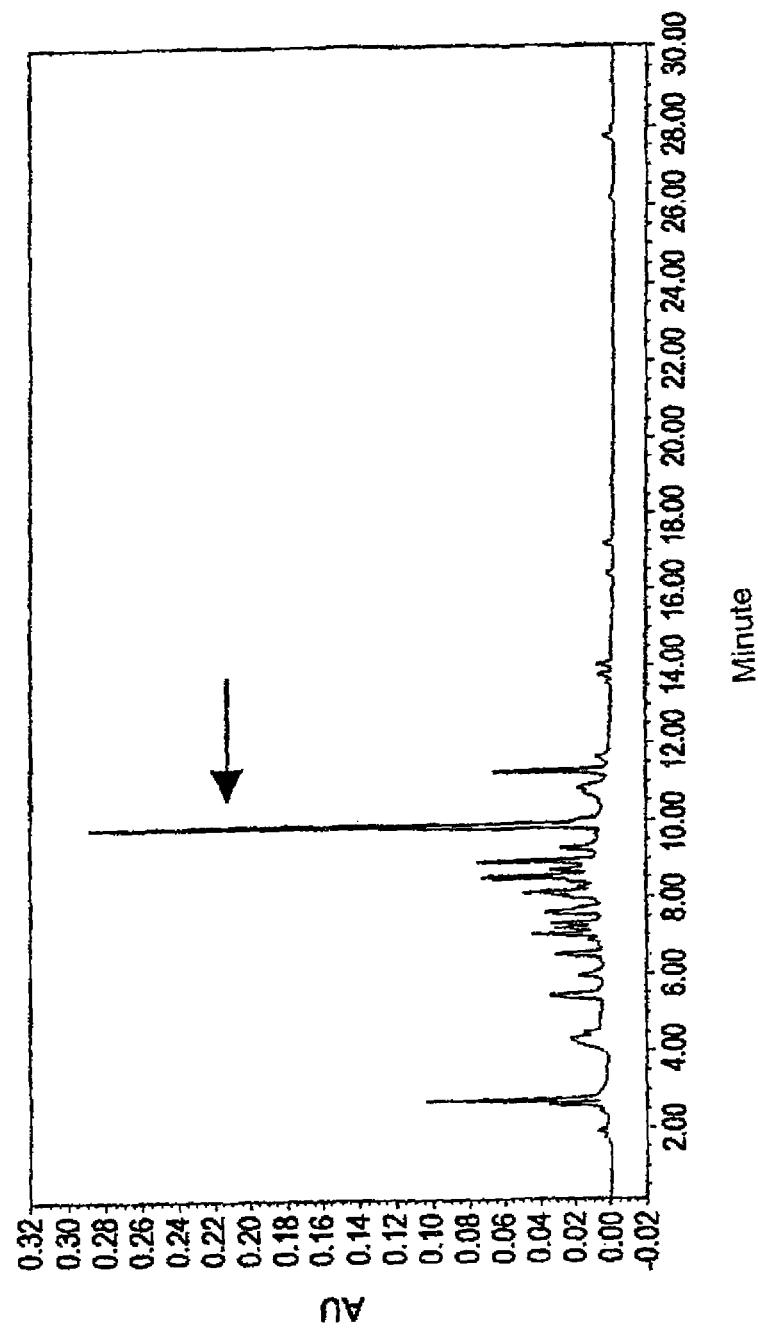
FIG. 1B shows the HPLC chart of a marketed chuhai B wherein the arrow indicates the peak assignable to eriocitrin (the same applies to the following figures).
Figure 1C:
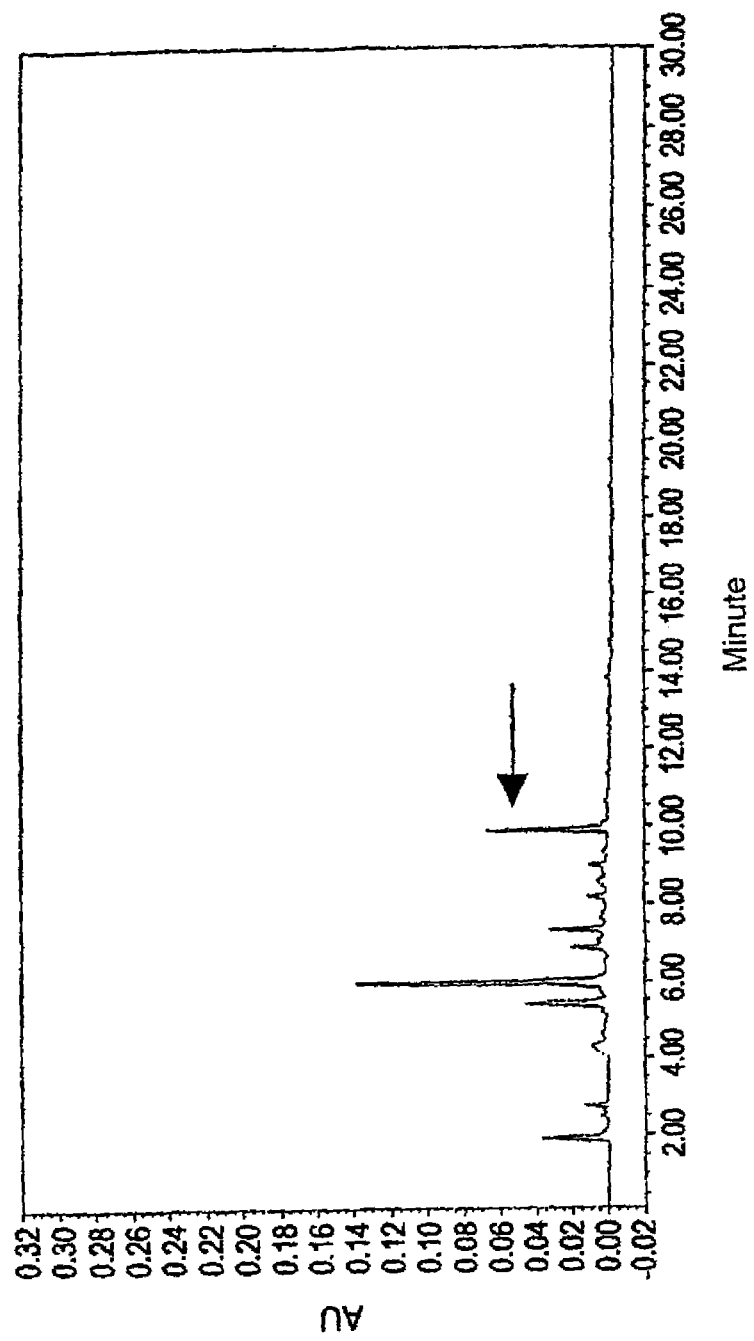
FIG. 1C shows the HPLC chart of a marketed chuhai C.
Figure 1D:
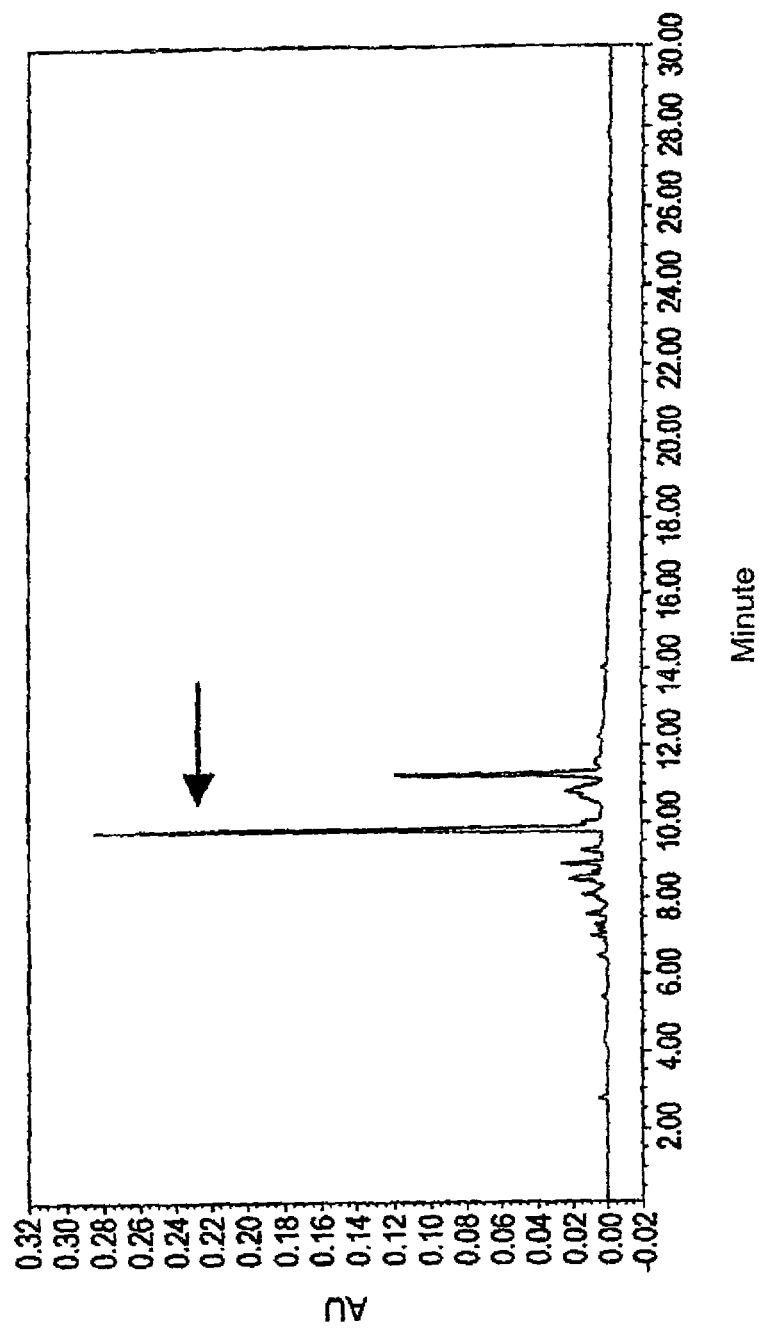
FIG. 1D shows the HPLC chart of the starting alcohol of Example 1.
Figure 1E:
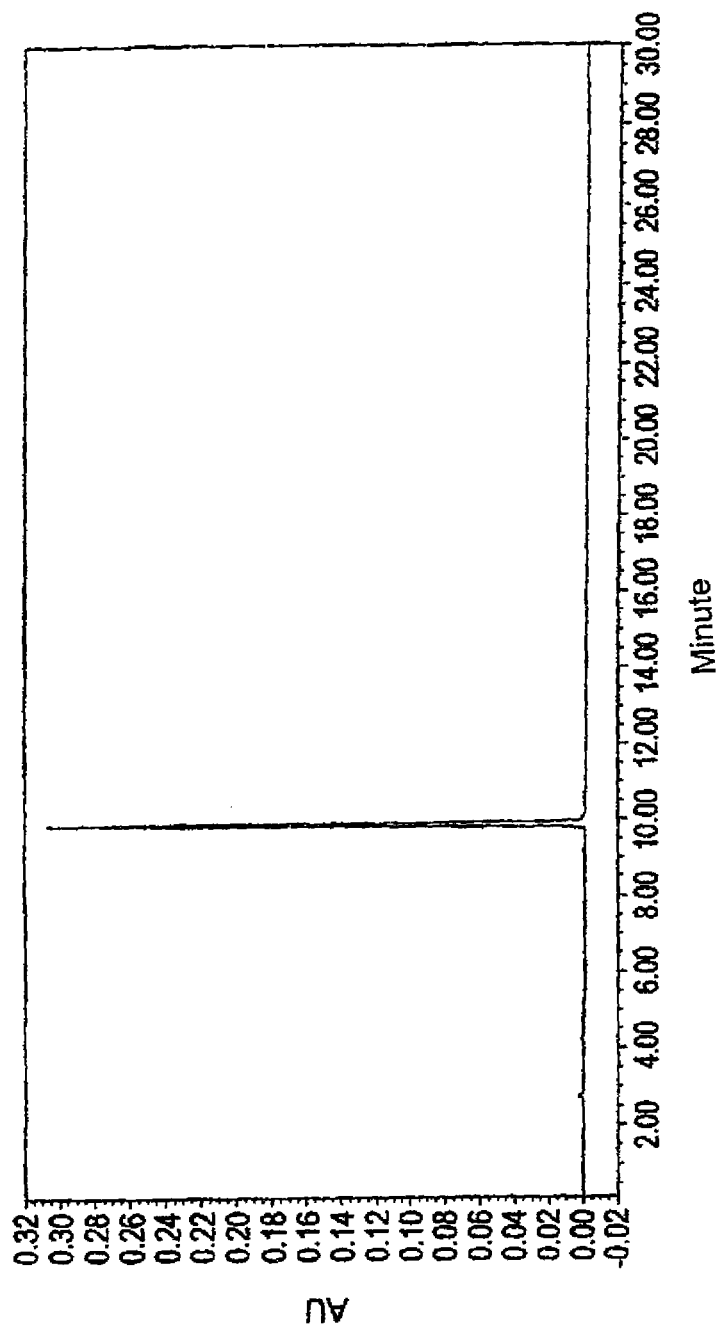
FIG. 1E is the HPLC chart of 100 ppm of eriocitrin.

HPLC Analysis Conditions:

Column: Develosil C30-UG-5 (4.6 i.d.×150 mm)
Elution: 0 to 100% $CH_3CN$, 0.05% TFA/30 min
Detection: UV 280 nm
Flow rate: 1 ml/min
Sample injection: 10 μL The results are shown in FIG. 1 and the following Table. The RTD of the present invention using the starting alcohol drink of Example 1 contained a large amount of lemon polyphenol. Further, it contained a smaller amount of contaminants than the marketed chuhai B containing a relatively large amount of the fruit juice.

TABLE 2

Lemon polyphenol content

|  | RTD of the invention* | Chuhai A | Chuhai B | Chuhai C |
|---|---|---|---|---|
| Hesperidin | 4 | 0 | 2 | 0 |
| Eriocitrin | 10 | 0 | 10 | 2 |
| Remarks | Fruit: 1% | Juice: 3% Perfume: + | Juice: 10% Perfume: − | Juice: 5% Perfume: + |

*Containing 10% (v/v) of the starting alcohol drink of Example 1.

Example 5

Comparison of Production Methods 1

The RTD using the starting alcohol drink of Example 1, an RTD using a starting alcohol produced by grinding with a mixer without freezing and grinding, and the marketed chuhai B (see Example 4) were compared.

Production of RTD:

The same lemon fruits as used in Example 1 were not frozen but ground as such using a mixer for household use. The ground matter was dipped in a 40% raw alcohol for 2 days and filtered to thereby give a starting alcohol drink. By using the starting alcohol drink obtained in Example 1 and the starting alcohol obtained herein (Comparative Example 1) respectively, RTDs of the compositions as shown in the following Table were produced.

TABLE 3

Composition

|  | Frozen-ground RTD | Mixer-ground RTD | Remarks |
|---|---|---|---|
| Starting alcohol drink (Ex. 1) | 25 mL |  | alcohol 40% |
| Starting alcohol drink (C. Ex. 2) |  | 25 mL | alcohol 40% |
| Raw alcohol | 8.7 mL | 8.7 mL | alcohol 95% |
| Saccharide | 9.8 g | 9.8 g |  |
| Souring agent | 0.8 g | 0.8 g |  |
| Carbonic water | ca 210 mL | ca 210 mL |  |
| Total | 250 mL | 250 mL |  |

The frozen-ground RTD was superior in fresh flavor to the mixer-ground RTD.

Forced Accelerated Denaturation Test:

Each RTD was subjected to a forced accelerated denaturation test at 50° C. After the completion of the forced denaturation, the RTDs were evaluated by a sensory test.

The sensory test was conducted on a 0 to 5 score basis (giving 5 points to each control having ideal qualities and 0 point to a sample having no commercial value) by 4 skilled panelists. The following Table shows the results.

TABLE 4

Sensory evaluation (average of 4 panelists)

|  |  | Frozen-ground RTD | Mixer-ground RTD | Chuhai B |
|---|---|---|---|---|
| Control |  | 5 | 5 | 5 |
| 50° C. | 3 days | 3.4 | 2.8 | 2.5 |
| 50° C. | 6 days | 2.1 | 1.4 | 1.5 |
| 50° C. | 12 days | 0.9 | 0.2 | 0.0 |

The frozen ground RTD suffered from less denaturation in flavor than the mixer-ground RTD and Chuhai B. This is seemingly because the freezing/grinding would promote the extraction of a component capable of preventing denaturation.

Example 6

Comparison of Production Methods 2

By using whole lemon fruits, an RTD (RTD1), in which alcohol drink having a frozen and ground matter dipped in alcohol was used, and another RTD (RTD2), which was produced by blending the frozen and ground matter as such (i.e., without dipping) and filtering, were compared.

Production of RTDs:

TABLE 5

Composition

|  | RTD 1 | RTD 2 | Remarks |
|---|---|---|---|
| Starting alcohol drink (Ex. 1) | 4 mL |  | Ground matter 10% w/v-alcohol 40% |
| Ground matter |  | 0.4 g |  |
| Raw alcohol | 17.6 mL | 19.3 mL | alcohol 95% |
| Saccharide | 5.0 g | 5.0 g |  |
| Souring agent | 0.6 g | 0.6 g |  |
| Carbonic water | ca 210 mL | ca 222 mL |  |
| Total | 250 mL | 250 mL |  |

Forced Accelerated Denaturation Test:

Each RTD was subjected to a forced accelerated denaturation test at 50° C. by use of a control having been stored at 5° C. After the completion of the forced denaturation, the RTDs were evaluated by a sensory test.

The sensory test was conducted on a 0 to 5 score basis (giving 5 points to each control having ideal qualities and 0 points to a sample having no commercial value) by 4 skilled panelists. The following Table shows the results.

TABLE 6

Sensory evaluation (average of 4 panelists)

|  |  | RTD1 | RTD2 |
|---|---|---|---|
| Control |  | 5 | 5 |
| 50° C. | 3 days | 3.8 | 2.8 |
| 50° C. | 6 days | 2.8 | 1.9 |
| 50° C. | 12 days | 1.9 | 0.8 |

Compared with RTD2 having the frozen and ground matter blended as such, RTD1 using the alcohol drink having the frozen and ground matter dipped in alcohol suffered from little denaturation in flavor. This is seemingly because the dipping would promote the extraction of a component capable of preventing denaturation.

When the controls were compared in flavor to each other, RTD1 using the alcohol drink having the frozen and ground matter dipped in alcohol showed a fresh and pronounced lemon flavor compared with RTD2 having the frozen and ground matter blended as such.

Example 7

Analysis of Aroma Component

An RTD using the starting alcohol drink of Example 1 and another RTD containing a hand-pressed juice were analyzed by GC-MS.

Production of RTD:

TABLE 7

| Composition | | | |
|---|---|---|---|
| | Frozen-ground RTD | Hand-pressed RTD | Remarks |
| Starting alcohol drink (Ex. 1) | 25 mL | | alcohol 40% |
| Juice (hand-pressed) | | 2.5 g | |
| Raw alcohol | 8.7 mL | 19.2 mL | alcohol 95% |
| Saccharide | 9.8 g | 9.8 g | |
| Souring agent | 0.8 g | 0.8 g | |
| Carbonic water | ca 210 mL | ca 222 mL | |
| Total | 250 mL | 250 mL | |

Pretreatment:

A 20 mL portion was collected from each sample and adsorbed by Extrelut 20. Then, aroma components were extracted with 60 mL of dichloromethane and concentrated at 35° C. under reduced pressure (450 mmHg) to 4 mL.

GC-MS Analysis Conditions:
Model: HP6890 (GC) and HP5973 (MS)
Column: HP-WAX (60 m×0.32 mm×0.5 μm)
Column temp.: 40° C. (5 min)-elevating at 10° C./min-100° C.-elevating at 5° C./min-230° C. (20 min)
Inlet temp.: 230° C.
Injection amount: 1 μL
Carrier gas: He (2.7 mL/min: constant flow rate)
Injection method: splitless (1 min)
Scanning scope: 35 to 450 m/z
Interface temp.: 230° C.
Ion source temp.: 230° C.

The following Table shows the results. The frozen/ground RTD contained the aroma components in larger amounts than the hand-pressed RTD.

TABLE 8

| | Results of analysis | | | | | | | | | |
|---|---|---|---|---|---|---|---|---|---|---|
| | Frozen/ground RTD | | | | | Hand-pressed RTD | | | | |
| Storage time at 50° C. (days) | 0 | 1 | 2 | 3 | 6 | 0 | 1 | 2 | 3 | 6 |
| Citral | ND | ND | ND | ND | ND | ND | ND | ND | ND | ND |
| Limonene | 2737 | 1237 | 507 | 192 | 117 | 27 | ND | ND | ND | ND |
| Geranyl acetate | 195 | 97 | ND | ND | ND | ND | ND | ND | ND | ND |
| Linalool | 74 | 130 | 64 | ND | ND | ND | ND | ND | ND | ND |
| Geraniol | 30 | 46 | ND | ND | ND | ND | ND | ND | ND | ND |
| p-Cymen | 49 | 61 | 63 | 52 | 54 | ND | ND | ND | ND | ND |
| p-Cymen-8-ol | 13 | 112 | 166 | 167 | 219 | ND | ND | ND | ND | ND |

Measured in accordance with the method described in Example 4. (ppm)

Example 8

Study on Alcohol Degree of Dipping Solution

Method:

By changing the alcohol degree of the raw alcohol to be used in the dipping to 20, 30, 40, 50 and 60%, alcohol drinks having the frozen and ground matter (lemon) dipped in alcohol were produced. The production procedure of Example 1 was followed, but dividing the lemon fruits not into 4 portions but into smaller pieces (about 1 cm×about 1 cm) before supplying them into the frozen grinder. The frozen and ground matter was dipped as such without thawing and then filtered through 4-layered gauze employed as a substitute for diatomaceous earth.

The alcohol drinks having the frozen and ground matter (lemon) dipped in alcohol at the respective alcohol degrees were each diluted 10-fold and subjected to a sensory evaluation and a turbidity measurement. By using the raw alcohol and water in the dilution, the final alcohol contents were all adjusted to 6%.

The sensory test was conducted on a 0 to 5 score basis by 9 skilled panelists.

The turbidity of each sample was measured at the point of adjusting the final alcohol content to 6%. In measuring the turbidity, a SIGRIST turbidimeter (Model KTL30-2M; manufactured by SIGRIST) was used.

Results:

The following Table shows the averages of the sensory evaluation scores by 9 panelists and turbidities.

TABLE 9

| | Sensory evaluation (average of 9 panelists) | | | | |
|---|---|---|---|---|---|
| | 20% | 30% | 40% | 50% | 60% |
| Score (perfect score: 5) | 2.1 | 2.8 | 3.9 | 3.7 | 3.3 |
| Free comment | Juicy but somewhat greenish smell. Faint flavor in total. | Juicy but somewhat faint flavor. | Well-balanced sourness and sweetness. Natural and pronounced lemon taste. | Pronounced peel texture but strong bitterness. | Pronounced and strong lemon taste but somewhat musty odor. |

TABLE 10

| | Turbidity | | | | |
|---|---|---|---|---|---|
| | 20% | 30% | 40% | 50% | 60% |
| Turbidity (Helm) | 118 | 70 | 120 | 332 | 348 |

An alcohol content of 40% or higher was preferable in the dipping, since a pronounced lemon taste could be obtained in such a case. Bitterness or musty odor became noticeable at an alcohol content of 50% or higher, while turbidity was observed at a low alcohol content. Thus, the optimum alcohol content was 40%.

Example 9

Study on Grain Size of Ground Matter

Method:

Lemons and grapefruits were frozen and ground with adjustment of the average grain size to 40, 100 and 200 µm by controlling the freezing/grinding conditions (time, etc.), thereby producing alcohols drinks having the frozen and ground matters dipped in alcohol.

The production methods of Examples 1 and 2 were followed, but dividing the lemon fruits not into 4 portions but into smaller pieces (about 1 cm×about 1 cm) before supplying them into the frozen grinder. The frozen and ground matter was dipped as such without thawing and then filtered through 4-layered gauze employed as a substitute for diatomaceous earth.

The alcohol drinks having the frozen and micro ground matters (lemon, grapefruits) at the respective grain sizes dipped in alcohol were diluted 4-fold with water and then subjected to a sensory test which was conducted on a 0 to 5 score basis by 9 skilled panelists as in Example 8.

Results:

The following Table shows the averages of the sensory evaluation scores by 9 panelists.

TABLE 11

| | Sensory evaluation (average of 9 panelists) | | | | | |
|---|---|---|---|---|---|---|
| | Lemon | | | Grapefruit | | |
| | 40 µm | 100 µm | 200 µm | 40 µm | 100 µm | 200 µm |
| Score (perfect score: 5) | 4.1 | 3.5 | 2.4 | 4.1 | 3.9 | 3.1 |
| Free comment | Fresh and pronounced lemon flavor. | Fresh lemon taste but somewhat faint aroma and bitter-ness. | Some-what flat aroma with faint lemon taste and enhanced bitter-ness. | Well-balanced sweet-ness, sourness and bitter-ness. Fresh taste of grape-fruit. | Fresh but somewhat greenish. | Somewhat faint aroma and strong bitter-ness. |

From the viewpoint of flavor, the optimum grain size was 40 µm.

The cell size of citrus fruits such as lemon ranges from 10 to 50 µm and the oil sac size in the epicarp (flavedo) thereof is about 250 µm (Osamu Ichikawa, *Shokuhin Soshikigaku*, Tokyo Koseikan, p. 239). Thus, it is assumed that by grinding to a grain size of 40 µm, intracellular components including essential oil are all homogeneously taken out into the powder.

Example 10

Study on the Effect of Freezing/Grinding

Method:

An alcohol drink having the frozen and micro ground matter (lemon) dipped in alcohol was produced. The production method of Example 1 was followed, but a sample produced by dividing the lemon fruits not into 4 portions but into smaller pieces (about 1 cm×about 1 cm) and supplying into the frozen grinder, which was referred to as a control (with FC), was compared with another sample produced by merely dividing the lemon fruits not into 4 portions but into smaller pieces (about 1 cm×about 1 cm) and not supplying them into the frozen grinder but freezing as such (no FC). Both of the frozen/ground sample and the non-ground sample were dipped as such without thawing and then filtered through 4-layered gauze employed as a substitute for diatomaceous earth.

The alcohols having the frozen and ground matters (lemon, grapefruits) at the respective grain sizes dipped in alcohol were diluted 4-fold with water and then subjected to a sensory test which was conducted on a 0 to 5 score basis by 9 skilled panelists as in Example 8.

Results:

The following Table shows the averages of the sensory evaluation scores by 9 panelists.

TABLE 12

| Sensory evaluation (average of 9 panelists) | | |
|---|---|---|
|  | With FC | No FC |
| Score (perfect score: 5) | 4.2 | 2.8 |
| Free comment | Fresh and natural taste of the whole lemon fruit. Well-balanced sourness and bitterness of lemon. | Only small amount of total aroma and less fresh taste. Off-balanced sourness and bitterness. |

Compared with the sample produced by merely dividing lemon fruits into pieces (about 1 cm×about 1 cm), the sample produced by grinding lemon fruits to give a grain size of 40 μm showed a pronounced lemon taste. Thus, it is preferred from the viewpoint of flavor to conduct the freezing/micro grinding to give a grain size of 40 μm.

Example 11

Production of Alcohol Drink Having Frozen and Ground Matter (Ume) Dipped in Alcohol, and Low Alcohol Drink An alcohol drink having a frozen and ground matter (ume) dipped in alcohol was produced. The production method of Example 1 was followed, but green ume fruits were employed and supplied into the frozen grinder as a whole, i.e., with stones. The frozen and ground matter was not thawed but dipped in alcohol as such.

By using the alcohol drink having the frozen and micro ground matter (ume) dipped in alcohol as the starting alcohol drink, an RTD of the following composition was produced.

TABLE 13

| Composition | | |
|---|---|---|
|  | Ume RTD | Remarks |
| Starting alcohol drink (Ex. 1) | 25 mL | alcohol 40% |
| Raw alcohol | 8.7 mL | alcohol 95% |
| Saccharide | 20 g |  |
| Souring agent | 1.0 g |  |
| Carbonic water | ca 204 mL |  |
| Total | 250 mL |  |

This RTD had a new flavor having the pronounced green ume taste, differing from the conventional chuhai products, diluted umeshu (ume liquor) or ume juice. The existing umeshu should be aged for at least 3 months (usually 6 months to 1 year) before taking. In contrast, the RTD obtained by the production method of the present invention could give a pronounced taste of green ume after dipping for only 1 to 3 days.

Example 12

Analysis of α-tocopherol (Vitamin E)

Alcohol drinks having the frozen and ground matters (lemon, grapefruit and ume) dipped in alcohol were produced. In the case of lemon, grinding was conducted so that the grain size was adjusted to 40, 100 and 200 μm as in Example 9. Next, the α-tocopherol (vitamin E) content in each alcohol drink was measured by the following method.

TABLE 14

Alcohol drink having frozen/ground matter dipped in alcohol 1 ml
↓    ← 1 ml 6% pyrogallol/ethanol
↓    ← 1 ml PMC (0.15 μg)
Preheating 70° C., 3 min
↓    ← 0.2 ml 60% KOH
Heating 70° C., 30 min
↓
Cooling in ice water
↓    ← 4.5 ml 1% NaCl
Extraction    (3 ml 10% ethyl acetate/hexane)
↓
Centrifugation 3000 rpm, 5 min
↓
Collection of n-hexane layer (2 ml)
↓
Evaporation (stream of $N_2$)
↓
Residue
Dissolved in 200 μl of n-hexane
↓
HPLC 10 μl injection Note)
PMC: internal standard (2,2,5,7,8-pentamethyl-6-chromanol)

HPLC Analysis Conditions:
Analysis column: Nucleosil $NH_2$ (250 mm×4.6 mm i.d.)
Mobile phase: n-hexane/2-propanol (97:3 v/v)
Flow rate: 1.2 ml/min
Detector: RF10Axl (fluorescent detector) (Ex. 297 mm, Em. 327 mm)

The following Table shows the α-tocopherol concentrations in the individual alcohol drinks and the α-tocopherol concentrations in the alcohol drinks produced by changing the lemon grain size.

TABLE 15

| α-Tocopherol concentration | |
|---|---|
|  | Concentration |
| Lemon | 32.16 ppm |
| Grapefruit | 11.10 ppm |
| Ume | 16.87 ppm |
| 40 μm | 31.56 ppm |
| 100 μm | 26.54 ppm |
| 200 μm | 21.46 ppm |

Thus, it could be understood that the alcohols produced by dipping the frozen and micro ground matters (lemon, grapefruit and ume) all contained vitamin E. It was also found out that the extraction efficiency was elevated with a decrease in the grain size.

Example 13

Measurement of Brittle Temperatures of Essential Oil Components Originating in Citrus Fruits The brittle temperatures of limonene, lemon essential oil, lime essential oil and grapefruit essential oil were measured.

Method:

Measurement was conducted by using a tensile test machine (TENSILON UTM-4-200 manufactured by Toyo Baldwin).

Around the measurement unit of the test machine, a heat-insulating box made of foaming styrol was provided and connected to a liquid nitrogen tank. The amount of the liquid nitrogen sprayed was controlled depending on the opening extent of an electromagnetic valve connected to a temperature controller. According to this constitution, the inside temperature of the heat insulating box could be maintained at the setting temperature ±0.5° C.

A compression device (plunger diameter: 3.0 mm) of the inventors' own making was attached to the measuring unit of the test machine. Then, the breaking load of each frozen citrus fruit essential oil was measured by the plunger puncture test method.

A sample container made of aluminum filled with a sample was placed on the stage of the measuring unit and the heat insulating box was cooled to the setting temperature. After confirming that the sample center temperature attained the setting temperature, the plunger puncture test was carried out. The measured value, which was obtained as the breaking load (expressed in kg), was converted to the corresponding S1 unit (expressed in N (Newton)) and further divided by the cross section area of the plugner ($7.07 \times 10^{-6}$ m$^2$). Thus, the measurement result was arranged as the breaking stress (expressed in Pa (Pascal)).

Figure 2A:
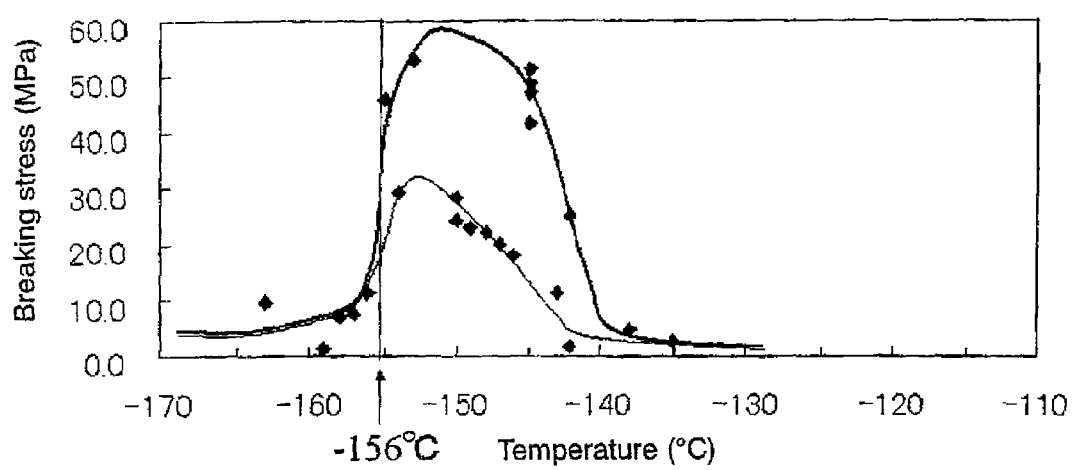
FIG. 2A is a graph which shows the brittle temperature of limonene.
Figure 2B:
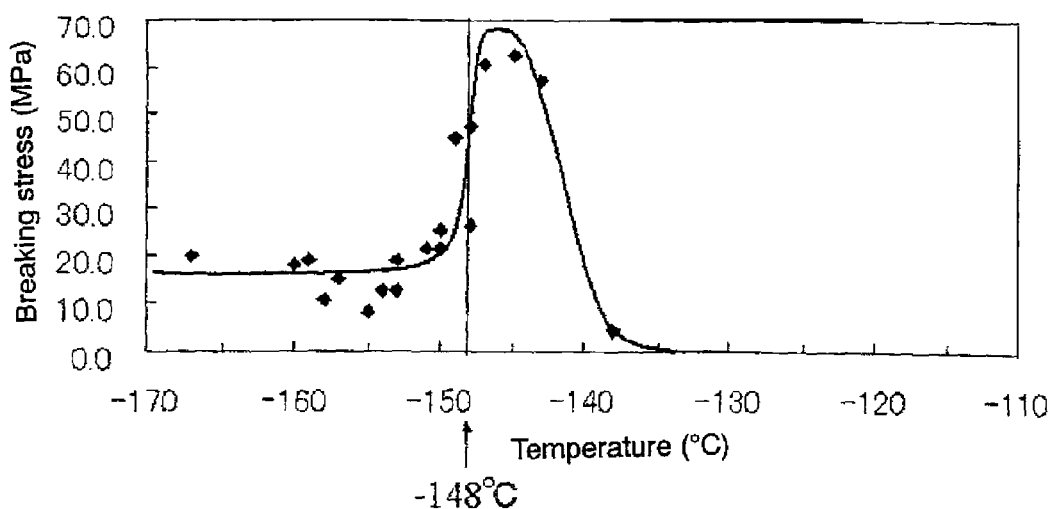
FIG. 2B is a graph which shows the brittle temperature of lemon essential oil.
Figure 2C:
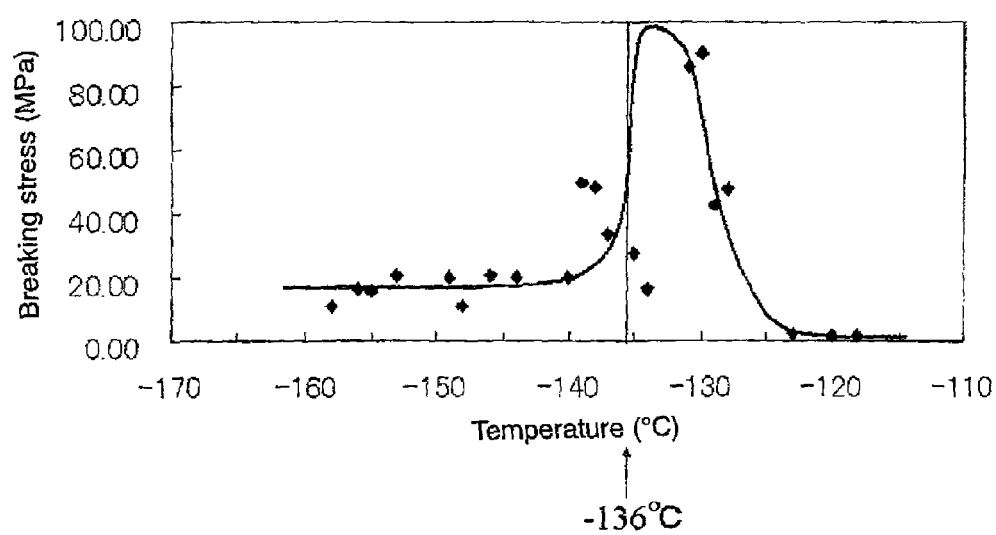
FIG. 2C is a graph which shows the brittle temperature of lime essential oil.
Figure 2D:
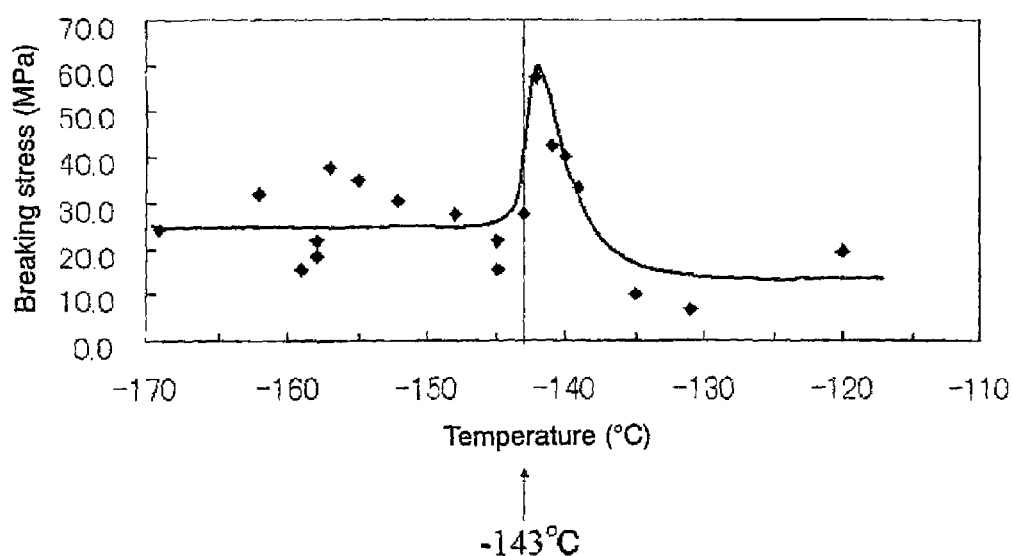
FIG. 2D is a graph which shows the brittle temperature of grapefruit essential oil.

Results and Discussion:

The results are shown in the following tables and FIGS. 2A to 2D.

TABLE 16

| Limonen | | | Lemon | | | Lime | | | Grapefruit | | |
|---|---|---|---|---|---|---|---|---|---|---|---|
| Temp. (° C.) | Load (kgf) | Stress (Mpa) | Temp. (° C.) | Load (kgf) | Stress (Mpa) | Temp. (° C.) | Load (kgf) | Stress (Mpa) | Temp. (° C.) | Load (kgf) | Stress (Mpa) |
| −135 | 1.8 | 2.5 | −138 | 3.0 | 4.2 | −118 | 1.0 | 1.4 | −120 | 14.0 | 19.4 |
| −138 | 3.2 | 4.4 | −143 | 41.0 | 56.9 | −120 | 0.8 | 1.1 | −131 | 5.0 | 6.9 |
| −142 | 1.2 | 1.7 | −145 | 45.0 | 62.4 | −123 | 1.3 | 1.8 | −135 | 7.2 | 10.0 |
| −142 | 18.0 | 25.0 | −147 | 43.5 | 60.3 | −128 | 34.5 | 47.9 | −139 | 24.0 | 33.3 |
| −143 | 8.0 | 11.1 | −148 | 34.0 | 47.2 | −129 | 31.0 | 43.0 | −140 | 29.0 | 40.2 |
| −145 | 37.0 | 51.3 | −148 | 18.8 | 26.1 | −130 | 65.3 | 90.6 | −140 | 28.8 | 39.9 |
| −145 | 35.0 | 48.5 | −149 | 32.2 | 44.7 | −131 | 62.0 | 86.0 | −141 | 30.5 | 42.3 |
| −145 | 30.0 | 41.6 | −149 | 32.3 | 44.8 | −134 | 12.0 | 16.6 | −142 | 41.5 | 57.6 |
| −145 | 35.0 | 48.5 | −150 | 15.5 | 21.5 | −135 | 20.0 | 27.7 | −143 | 20.0 | 27.7 |
| −145 | 34.0 | 47.2 | −150 | 18.2 | 25.2 | −137 | 24.5 | 34.0 | −145 | 11.0 | 15.3 |
| −146 | 13.0 | 18.0 | −151 | 15.3 | 21.2 | −138 | 35.0 | 48.5 | −145 | 15.5 | 21.5 |
| −147 | 14.5 | 20.1 | −153 | 13.5 | 18.7 | −139 | 36.0 | 49.9 | −148 | 20.0 | 27.7 |
| −148 | 16.0 | 22.2 | −153 | 9.0 | 12.5 | −140 | 14.2 | 19.7 | −152 | 22.0 | 30.5 |
| −149 | 16.5 | 22.9 | −154 | 9.0 | 12.5 | −144 | 14.5 | 20.1 | −155 | 25.0 | 34.7 |
| −150 | 20.5 | 28.4 | −155 | 6.0 | 8.3 | −146 | 15.0 | 20.8 | −157 | 27.0 | 37.5 |
| −150 | 17.5 | 24.3 | −157 | 11.0 | 15.3 | −148 | 7.8 | 10.8 | −158 | 13.3 | 18.4 |
| −153 | 38.0 | 52.7 | −158 | 7.8 | 10.8 | −149 | 14.5 | 20.1 | −158 | 15.5 | 21.5 |
| −154 | 21.0 | 29.1 | −159 | 13.5 | 18.7 | −153 | 14.8 | 20.5 | −159 | 11.0 | 15.3 |
| −155 | 33.0 | 45.8 | −160 | 13.0 | 18.0 | −155 | 11.5 | 16.0 | −162 | 23.0 | 31.9 |
| −156 | 8.0 | 11.1 | −167 | 14.3 | 19.8 | −156 | 11.8 | 16.4 | −169 | 17.5 | 24.3 |
| −157 | 5.5 | 7.6 | | | | −158 | 8.0 | 11.1 | | | |
| −158 | 5.0 | 6.9 | | | | | | | | | |
| −159 | 1.0 | 1.4 | | | | | | | | | |
| −163 | 7.0 | 9.7 | | | | | | | | | |

In limonene (FIG. 2A), the breaking stress began to increase at around −140° C. and attained a peak at around −153° C. When cooling was further continued, the breaking stress showed a rapid decrease. The brittle temperature was −156° C. In lemon essential oil (FIG. 2B), the breaking stress began to increase at around −140° C. and attained a peak at around −145° C. When cooling was further continued, the breaking stress showed a rapid decrease. The brittle temperature was −148° C. In lime essential oil (FIG. 2C), the breaking stress began to increase at around −125° C. and attained a peak at around −133° C. When cooling was further continued, the breaking stress showed a rapid decrease. The brittle temperature was −136° C. In grapefruit essential oil (FIG. 2D), the breaking stress began to increase at around −135° C. and attained a peak at around −141° C. When cooling was further continued, the breaking stress showed a rapid decrease. The brittle temperature was −143° C. The brittle temperatures of the 4 kinds of citrus fruit-origin essential oil components measured herein ranged from −156 to −136° C. In the case of powdering an essential oil component contained in a fruit by the freeze grinding method, sufficient micro powdering can be conducted by freezing the component at its brittle temperature or below. When the component is extracted by selecting the physical properties of the ground matter by appropriately determining the freezing temperature, the flavor component and composition can be controlled, which makes it possible to obtain a food or drink having the desired flavor.

Example 14

Production of Alcohol Drink Having Frozen and Ground Lemon Pericarp Dipped in Alcohol Fresh lemon pericarp being rich in limonene and lemon essential oil was divided so that it could be supplied into a frozen grinder, as will be described hereinafter, and then frozen in a freezer at −80° C. Next, the frozen matter was supplied into a frozen grinder (Table-Type High-Speed Hammer Mill Model 1018; manufactured by YOSHIDA SEISAKUSHO K.K.) and ground in the frozen state by feeding liquid nitrogen at a controlled amount so as to adjust the grinding temperature to −60° C. or −160° C. Thus, a frozen and ground matter was obtained. Next, the frozen and ground matter was dipped in a 40% raw alcohol for 1 minute (100 g/L). The obtained dipping solution was filtered through a paper filter and a 0.45 μm membrane filter to thereby remove solid matters. Thus, alcohol drinks having lemon pericarp frozen and ground at −60° C. or −160° C. and dipped in alcohol was obtained.

Each alcohol drink having the frozen and ground matter dipped in alcohol was diluted 5-fold and sensorily evaluated.

The sensory test was conducted on a 0 to 5 score basis by 7 skilled panelists.

Evaluation Criteria

5: Fresh and pronounced lemon flavor.

3: Fresh lemon flavor.

1: Fresh but faint lemon flavor.

Results

The following Table shows the results of the sensory test expressed in the average of 7 skilled panelists.

TABLE 17

Sensory evaluation (average of 7 panelists)

|  | Ground at −160° C. | Ground at −60° C. |
|---|---|---|
| Score (perfect score: 5) | 3.8 | 3.3 |
| Free comment | Pronounced lemon taste at middle to bottom with rich lemon flavor. | Fresh but faint and watery lemon taste. |

The alcohol drink using the matter frozen and ground at −160° C. was superior in the fresh and pronounced lemon taste to the alcohol drink using the matter frozen and ground at −60° C.

Example 15

Analysis of Aroma Component

Aroma components of the alcohol drinks of Example 14 were analyzed by GC and the contents of the individual components were compared based on the areas in the chromatograms.

Pretreatment:

A 3 mL portion was collected from each sample and adsorbed by Extrelut 3. Then, aroma components were extracted with 15 mL of dichloromethane and concentrated at 35° C. under reduced pressure (450 mmHg) to 0.8 mL.

GC Analysis Conditions:

Model: HP6890 (GC)

Column: HP-WAX (60 m×0.32 mm×0.25 μm)

Column temp.: 60° C. (10 min)-elevating at 3.50° C./min-220° C. (30 min)

Inlet temp.: 200° C.

Injection amount: 1 μL

Carrier gas: He (1 mL/min: constant flow rate)

Injection method: splitless

Detection: FID

Figure 3A:
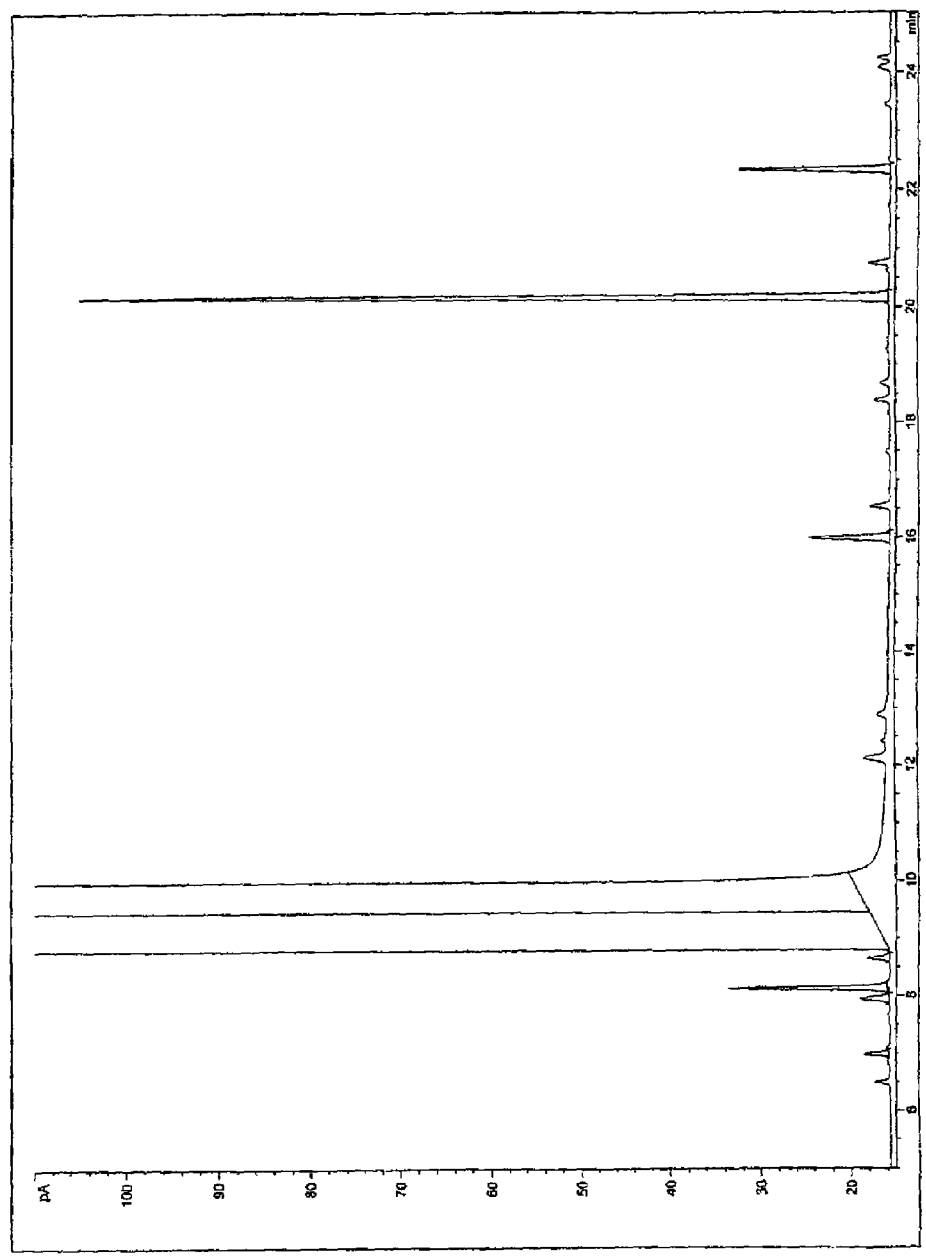
FIG. 3A is the GC chromatogram (the first half) of the alcohol drink using the matter having been ground at −160° C. in Example 14.
Figure 3B:
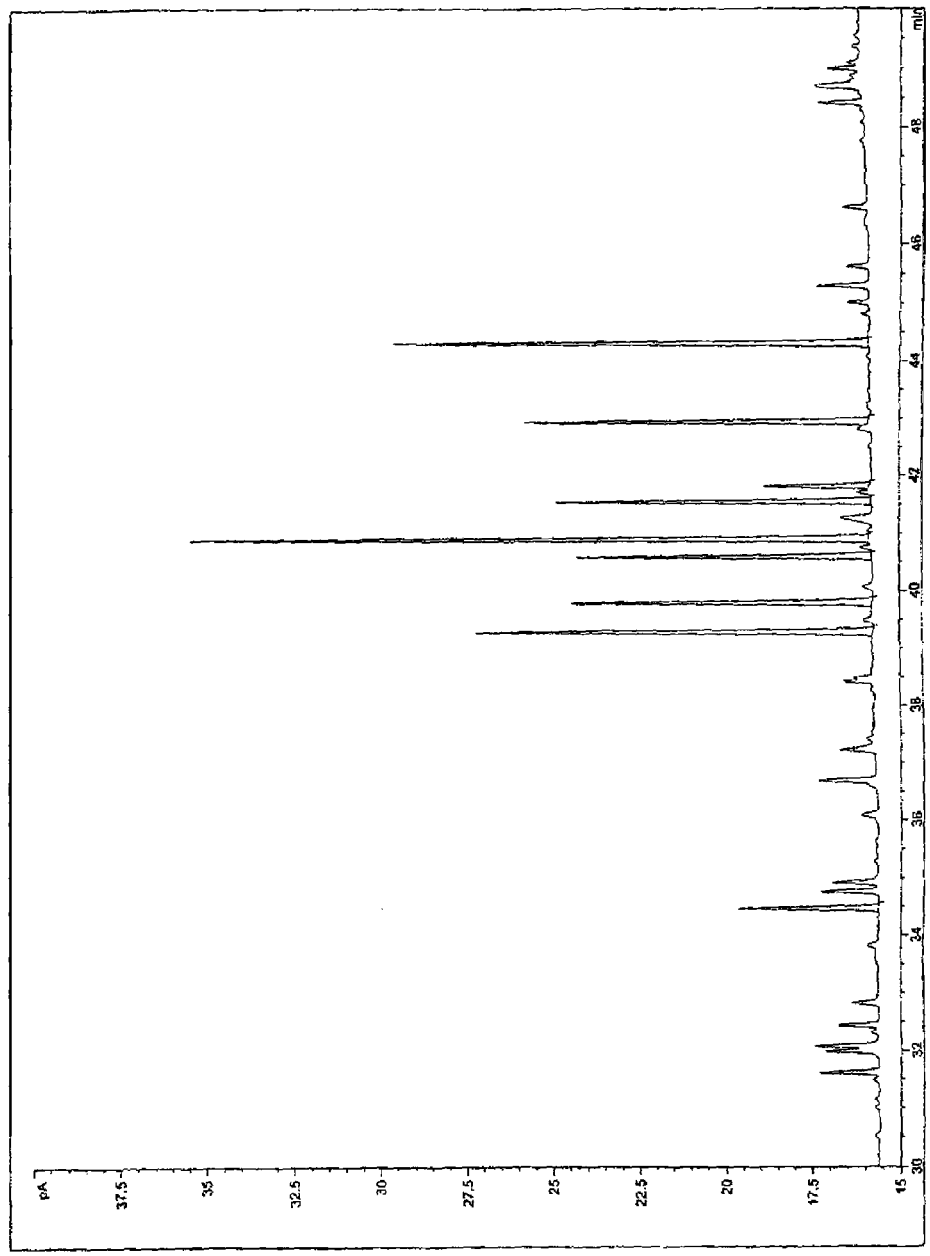
FIG. 3B is the GC chromatogram (the second half) of the alcohol drink using the matter having been ground at −160° C. in Example 14.
Figure 3C:
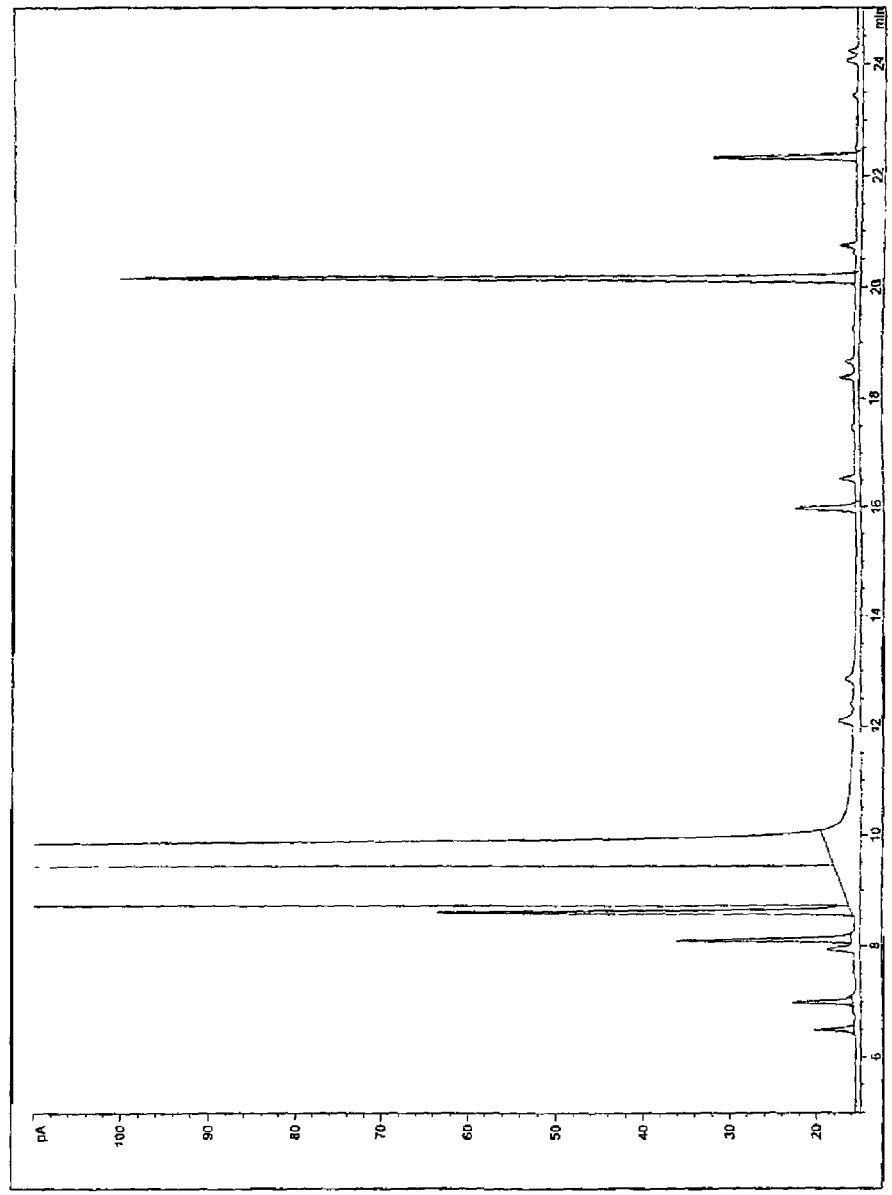
FIG. 3C is the GC chromatogram (the first half) of the alcohol drink using the matter having been ground at −60° C. in Example 14.
Figure 3D:
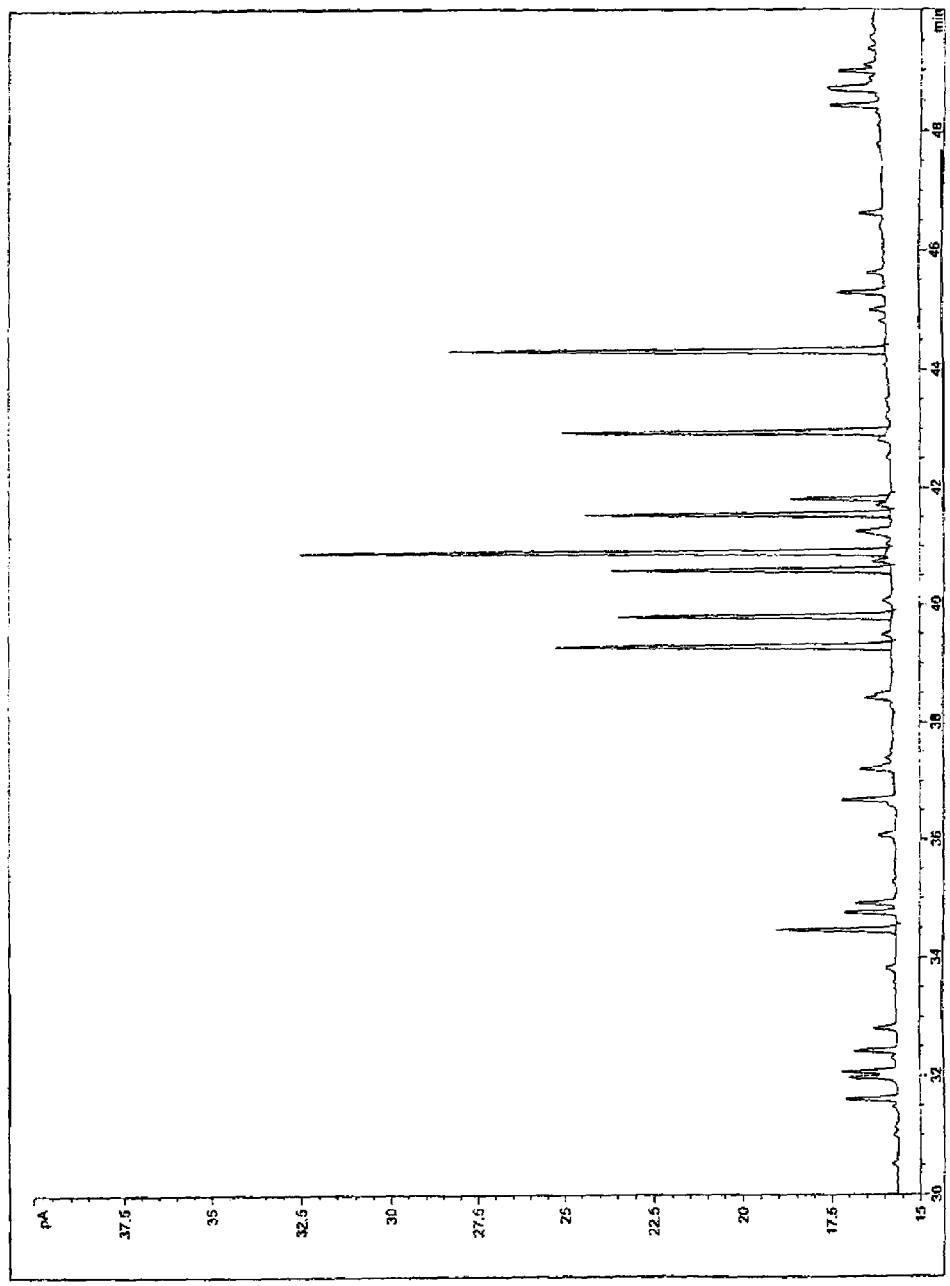
FIG. 3D is the GC chromatogram (the second half) of the alcohol drink using the matter having been ground at −60° C. in Example 14.

FIGS. 3A to 3D and the following Table show the results. The alcohol drink using the matter frozen and ground at −160° C. contained 6 to 20% more aroma components than the alcohol drink using the matter frozen and ground at −60° C. By appropriately selecting the grinding temperature based on the brittle temperatures of limonene and lemon essential oil, products sufficiently containing the effective aroma components can be obtained.

TABLE 18

Comparison of aroma components in GC chromatograms

|  |  | Area | | |
|---|---|---|---|---|
| RT (min.) | Component | Ground at −160° C. (A) | Ground at −60° C. (B) | Ratio (A)/(B) |
| 20.15 | Limonene | 379 | 357 | 1.06 |
| 34.49 | Linalool | 14 | 12 | 1.17 |
| 39.28 | Neral | 42 | 35 | 1.20 |
| 39.8 | a-Terpineol | 32 | 28 | 1.14 |
| 40.89 | Geranial | 71 | 59 | 1.20 |
| 44.31 | Geraniol | 48 | 44 | 1.09 |

INDUSTRIAL APPLICABILITY

The present invention is usable for producing a food or drink. According to the method of the present invention, a food or drink which sufficiently and/or balancedly contains desired components can be provided.

The invention claimed is:

1. A method of producing a food or drink comprising:
   providing raw material selected from the group consisting of fruit(s), vegetable(s), bean(s), nut(s), mushroom(s), alga(e) and tea(s);
   freezing the raw material to form a frozen material;
   grinding the frozen material at a controlled temperature until an average grain size of the ground material is about 1 micron to about 400 microns, wherein the controlled temperature is not higher than the brittle temperature of an aroma component, a colorant, or an essential oil in the frozen material, to form a ground material;
   dipping the ground material into a solution comprising 15% to 60% alcohol;
   extracting one or more components from the solution to form a food or drink ingredient; and
   adding the food or drink ingredient to a food or drink.

2. The method of claim 1, wherein the raw material is a citrus fruit; and
   the controlled temperature is not higher than the brittle temperature of limonene and/or citrus fruit essential oil.

3. The method of claim 1, wherein the average grain size of the ground material is about 40 to about 100 microns.

4. The method of claim 1, wherein before the step of freezing the method further comprises a step of preliminarily freezing at a temperature higher than the freezing temperature of the raw material.

5. A method of extracting a food or drink additive, comprising:
   providing raw material selected from the group consisting of fruit(s), vegetable(s), bean(s), nut(s), mushroom(s), alga(e) and tea(s);
   freezing the raw material to form a frozen material;
   grinding the frozen material at a controlled temperature until an average grain size of the ground material is about 1 micrometer to about 400 micrometers, wherein the controlled temperature is not higher than the brittle temperature of an aroma component, a colorant, or an essential oil in the frozen material, to form a ground material;
   dipping the ground material into a solution comprising 15% to 60% alcohol; and
   extracting one or more components from the solution to form a food or drink additive.

6. The method of claim 4, wherein the step of preliminarily freezing comprises the raw material being frozen to a range of −80° C. to −4° C.

7. The method of claim 5, wherein the average grain size of the ground material is about 40 microns to about 100 microns.

8. A method of making a food or drink additive, comprising:
   providing raw material selected from the group consisting of fruit(s), vegetable(s), bean(s), nut(s), mushroom(s), alga(e) and tea(s);
   freezing the raw material to form a frozen material;
   grinding the frozen material until an average grain size of the ground material is about 1 micron to about 400 microns to form a ground material,
   dipping the ground material into a solution comprising 15% to 60% alcohol; and
   extracting one or more components from the solution to form a food or drink additive.

9. A method of making a food or drink, comprising:
   providing raw material selected from the group consisting of fruit(s), vegetable(s), bean(s), nut(s), mushroom(s), alga(e) and tea(s);
   freezing the raw material to form a frozen material;
   grinding the frozen material until an average grain size of the ground material is about 1 micron to about 400 microns to form a ground material,
   dipping the ground material into a solution comprising 15% to 60% alcohol;
   extracting one or more components from the solution to form a food or drink additive; and
   adding the food or drink additive to a food or drink.

* * * * *